US010546379B2

(12) United States Patent
Jia et al.

(10) Patent No.: US 10,546,379 B2
(45) Date of Patent: *Jan. 28, 2020

(54) INTERACTIVE VIDEO GENERATION

(71) Applicant: INTERNATIONAL BUSINESS MACHINES CORPORATION, Armonk, NY (US)

(72) Inventors: Hong Wei Jia, Beijing (CN); Qian Li, Beijing (CN); Shuang Li, Beijing (CN); Hai Lei Song, Beijing (CN); Yun Ting Wang, Beijing (CN); Xin Ying Yang, Beijing (CN); Wenyan Yuan, Beijing (CN); Guang Ming Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/832,852

(22) Filed: Dec. 6, 2017

(65) Prior Publication Data

US 2018/0095643 A1    Apr. 5, 2018

Related U.S. Application Data

(63) Continuation of application No. 15/150,477, filed on May 10, 2016, now Pat. No. 10,204,417.

(51) Int. Cl.
*G06T 7/11*    (2017.01)
*G06K 9/62*    (2006.01)
(Continued)

(52) U.S. Cl.
CPC ............... *G06T 7/11* (2017.01); *G06F 3/048* (2013.01); *G06K 9/00751* (2013.01); *G06K 9/6202* (2013.01); *G11B 27/00* (2013.01)

(58) Field of Classification Search
CPC ............... G06T 7/11; G06T 7/10–197; G06K 9/00711–00765; G06F 3/048
See application file for complete search history.

(56) References Cited

U.S. PATENT DOCUMENTS 5,819,286 A * 10/1998 Yang ................... G06K 9/00744
6,118,923 A *  9/2000 Rodriguez ............ G11B 27/28
                                                              386/241
(Continued)

FOREIGN PATENT DOCUMENTS

CN    100471255 C    3/2009
CN    104581403 A    4/2015
WO    2011159257 A1  12/2011

OTHER PUBLICATIONS

Mylonas et al., "Towards an integrated personalized interactive video environment", IEEE Sixth International Symposium on Multimedia Software Engineering, Dec. 13-15, 2004, pp. 1-8.
(Continued)

*Primary Examiner* — Jennifer N To
*Assistant Examiner* — Liang Y Li
(74) *Attorney, Agent, or Firm* — Michael A. Petrocelli

(57) ABSTRACT

A method includes receiving an input from a user, the input including a selection of an object, where the object is contained in a video, identifying, in response to the input, the object in the video, determining an attribute of the object associated with a profile of the user, where the profile contains a preference of the user regarding at least one object to be viewed, and determining, in response to the attribute of the object associated with the profile, a target segment in the video, where the target segment includes the object.

9 Claims, 6 Drawing Sheets

(51) Int. Cl.
*G06K 9/00* (2006.01)
*G06F 3/048* (2013.01)
*G11B 27/00* (2006.01)

(56) References Cited

U.S. PATENT DOCUMENTS

| | | | |
|---|---|---|---|
| 7,343,617 | B1 | 3/2008 | Katcher et al. |
| 8,549,550 | B2 | 10/2013 | Lopatecki et al. |
| 10,204,417 | B2 | 2/2019 | Jia |
| 2007/0245379 | A1 | 10/2007 | Agnihortri |
| 2009/0022472 | A1* | 1/2009 | Bronstein .......... G06K 9/00751 |
| | | | 386/278 |
| 2009/0037292 | A1 | 2/2009 | Panjwani |
| 2009/0103887 | A1 | 4/2009 | Choi et al. |
| 2009/0138906 | A1 | 5/2009 | Eide et al. |
| 2013/0108241 | A1 | 5/2013 | Miyamoto et al. |
| 2013/0195422 | A1 | 8/2013 | Palil et al. |
| 2014/0074866 | A1 | 3/2014 | Shah et al. |
| 2014/0092244 | A1* | 4/2014 | Tang .................. H04N 7/18 |
| | | | 348/143 |
| 2015/0066920 | A1 | 3/2015 | Barta |
| 2015/0178930 | A1 | 6/2015 | Gao |
| 2015/0293928 | A1* | 10/2015 | Chen .................. G06F 16/78 |
| | | | 707/738 |
| 2017/0329493 | A1 | 11/2017 | Jia et al. |

OTHER PUBLICATIONS

Hjelsvold et al., "Web-based Personalization and Management of Interactive Video", May 1-5, 2001, pp. 1-23, Hong Kong, http://www10.org/cdrom/papers/405/.

Mell et al., "The NIST Definition of Cloud Computing", National Institute of Standards and Technology, Special Publication 800-145, Recommendations of the National Institute of Standards and Technology, Sep. 2011, 7 pages.

IBM: List of IBM Patents or Patent Applications Treated as Related (Appendix P), Jan. 19, 2018, 2 pages.

\* cited by examiner

INTERACTIVE VIDEO GENERATION

BACKGROUND

The present invention generally relates to multimedia, image processing, and analytics, and more particularly, to a method for generating personal visual segments from a video based on user preferences.

Video technology is a popular instrument for entertainment and/or delivering information. Movies, television programs, and games may be provided by local or remote sources for recording, copying, playback, broadcasting, and display of moving visual media. Media player devices including, for example, personal computers (PCs), mobile devices, cable television boxes, video game consoles may obtain videos from such local or remote sources and present them to a plurality of users.

SUMMARY

In one aspect of the present disclosure, a computer-implemented method is proposed. According to the method, an input from a user is received. In response, an object is identified from a video. Then, it is determined whether the object has an attribute associated with a profile of the user. The profile indicates preference of the user concerning objects to be viewed. If the object has an attribute associated with the profile, a target segment including the object is determined from the video.

In another aspect of the present disclosure, a device is proposed. The device includes one or more processors and a memory coupled to at least one of the processors. A set of computer program instructions are stored in the memory and executed by at least one of the processors in order to perform actions. The actions include identifying an object in a video in response to receiving an input from a user; determining whether the object has an attribute associated with a profile of the user, the profile indicating preference of the user concerning objects to be viewed; and in response to determining that the object has an attribute associated with the profile, determining a target segment including the object from the video.

In yet another embodiment, a computer program product is proposed. The computer program product is tangibly stored on a non-transient machine readable medium and comprising executable instructions which, when executed on a device, cause the device to identify an object in a video in response to receiving an input from a user; determine whether the object has an attribute associated with a profile of the user, the profile indicating preference of the user concerning objects to be viewed; and in response to determining that the object has an attribute associated with the profile, determine a target segment including the object from the video.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Typically, a video is presented to a user in a passive way not an interactive way. For instance, if the user is interested in viewing or obtaining more details about a certain object (e.g. a movie star in the video), the user has to watch the video in its entirety and/or manually look for video segments (also referred to as the "segments") or images in which the object of interest (e.g. movie star) appears. Although some video games have used pre-recorded video sequences that are displayed in response to a user input, such user input is typically used to maintain the video games running and not to improve the user experience. Therefore, by taking into account preferences defined by a user in a user profile, embodiments of the present disclosure may, among other potential benefits, provide an interactive video format such that the preferences specified by the user in the user profile are met.

Figure 1:
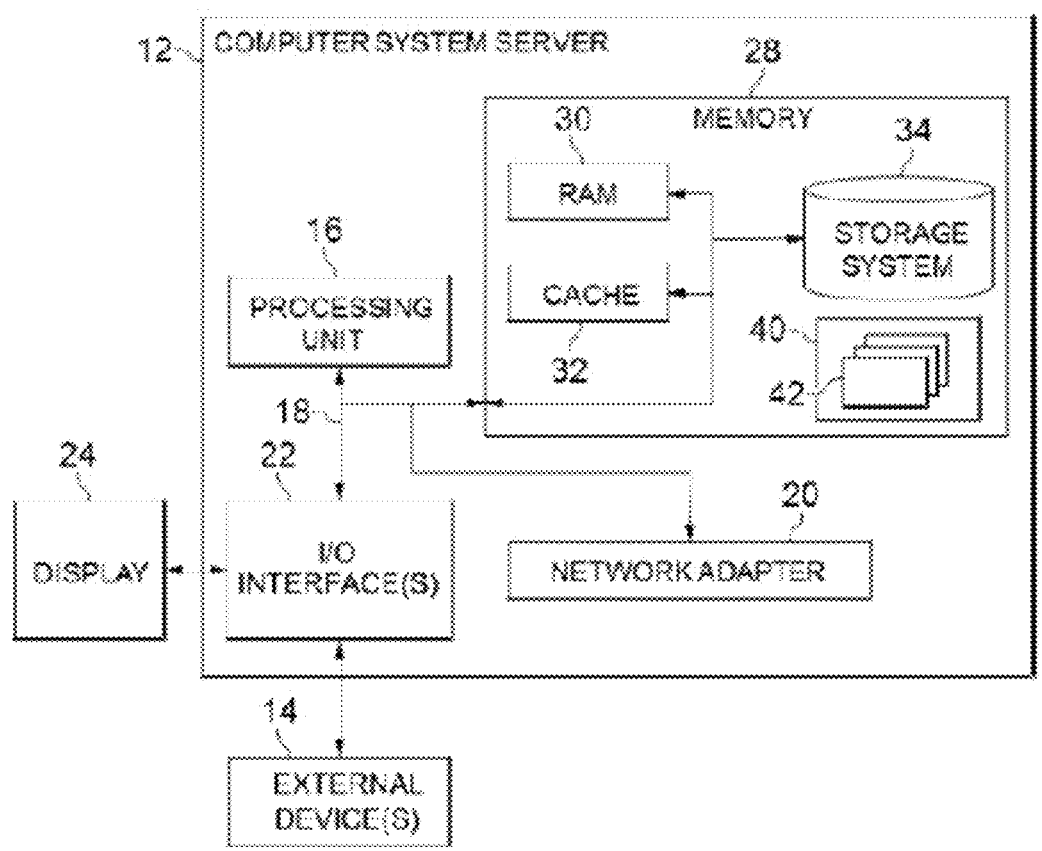
FIG. 1 is a block diagram of internal and external components of a computer device, according to an embodiment of the present disclosure.

Referring now to FIG. 1, an exemplary device, referred to as computer system/server 12, which is appropriate to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is depicted in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

It should be noted that the computer system/server 12 may be implemented as any suitable computing device, including but not limited to, a personal computer, a workstation, a mainframe, a midrange computer, a network appliance, a palm top computer, a telephony device, a blade computer, a hand held computer, and the like.

Figure 2:
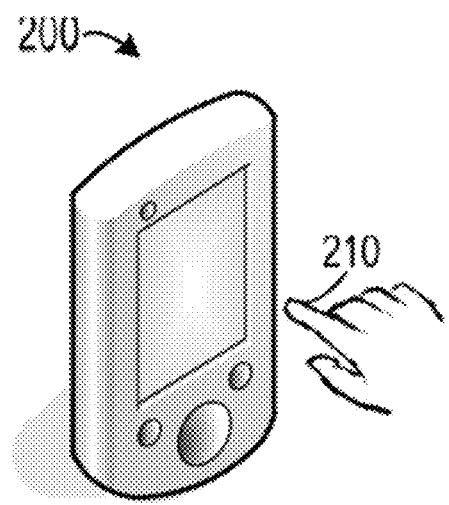
FIG. 2 is a schematic diagram of a computer device, according to an embodiment of the present disclosure.

Referring now to FIG. 2, a schematic diagram of a device 200 in which embodiments of the present disclosure can be implemented is shown. The device 200 may be implemented by the computer system/server 12 as illustrated in FIG. 1. Examples of the device 200 may include, but are not limited to, mobile phones, desktops, laptops and tablets, or any other suitable computing system/device, either known at present or to be developed in the future.

Specifically, in the example shown in FIG. 2, the device 200 identifies an object in a video upon receipt of an input 210 from a user (hereinafter referred to as "user input"). In embodiments of the present disclosure, the term "object" may refer to a product, a person, a facility, and/or any other thing that appears in the video. Then, the device 200 determines whether the object has an attribute associated with a profile of the user (also referred to as "user profile" or "profile"). The attribute of the object may generally include characteristics of the object, for example, a type of the object, target customers of the object, prices of the object, manufacturers of the object, and so on.

The user profile may include at least one preference of the user concerning objects to be viewed. If the object has an attribute associated with the profile, the device 200 determines a target video segment (also referred to as "target segment") including the object from the video. The target segment may consist of one or more segments including the object. As such, the target segment may be determined from the video according to the user's preference. In this way, it is possible to meet the user's personalized demands by displaying the target segment(s) containing the object the user is interested in, thereby improving the user experience.

It may be understood that the device 200 shown in FIG. 2 is described merely for the purpose of illustration, without suggesting any limitation as to the scope of the disclosure. Those skilled in the art will appreciate that various other implementations of the device 200 are contemplated.

Figure 3:
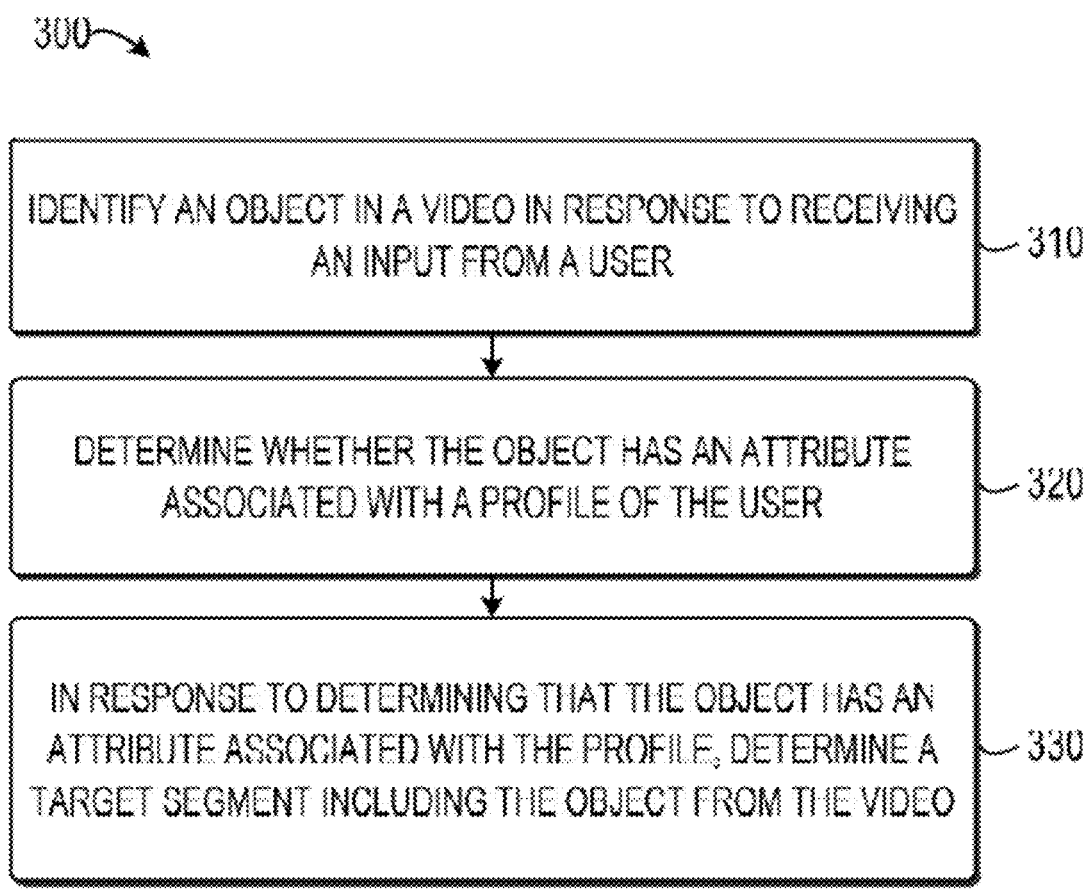
FIG. 3 is a flowchart describing the steps of a method for video interaction, according to an embodiment of the present disclosure.

Referring now to FIG. 3, a method 300 for video interaction is described in accordance with embodiments of the present disclosure. The method 300 may be at least in part implemented by, for example, the device 200 (FIG. 2).

The method 300 may start at step 310, where an object in a video is identified in response to receiving an input from a user. As described above the object may include, for example, a product, a person, a facility, and/or any other thing that appears in the video. In some embodiments, the product may include, but is not limited to, dresses, jerseys, scarves, gloves, balls, musical instruments, foods, drinks, mobile phones, and laptops. The person may be, for example, a movie star, an athlete, a model, or any other person that appears in the video. The facility may be, for example, a stadium, a museum, and the like. It should be noted that the above examples are only described for illustration rather than limitation, those skilled in the art would understand that the object may refer to any other suitable things.

The user may manipulate the device 200 (FIG. 2) via a keyboard, keypad, touch screen, trackball, and the like. Upon detection of the user input (e.g. a finger of the user contacting the touch screen), the device 200 (FIG. 2) may identify an object from the video corresponding to a position of the user's finger on the touch screen. The identification may be implemented in a variety of ways. In some embodiments, the device 200 (FIG. 2) may determine a frame of the video corresponding to the user input in terms of time. That is, the frame is an image in the video which is being presented at the time of receiving the user input. Then, the device 200 (FIG. 2) may identify the object from the determined frame by performing image recognition techniques, such as, for example, edge matching, divide-and-conquer search, greyscale matching, and gradient matching.

It may be understood that the above embodiments for identifying the object by performing image recognition are described only for the purpose of illustration to help those skilled in the art to understand the present disclosure, without suggesting any limitations as to the scope of the disclosure. It would be appreciated that the image recognition may be implemented in a variety of ways, which are not detailed here to avoid obscurity.

Alternatively, in some embodiments, it may be unnecessary to perform real-time image recognition when identifying the object at step 310. Instead, the object may be identified from the frame based on an object position list. The object position list includes information about positions of objects in frames of the video. Such a list may be created, for example, in generation of the video or post-processing of the video. In those embodiments, the device 200 (FIG. 2) may determine a frame of the video corresponding to the user input in terms of time, and then determine a position of the user input on the frame. With the position of the user input, the device 200 (FIG. 2) may determine a matched position from the positions predefined in the object position list, and find the object corresponding to the matched position based on the object position list.

Next, in step 320, it is determined whether the object has an attribute associated with a user profile. A user profile includes personal data associated with the user, for example, the user's hobbies, habits, interests, gender and/or age. The profile may be used to determine the preference of the user for the objects to be viewed. In one embodiment, if the profile indicates that the user is a female, it may be determined that the user would like to view objects associated with shopping, cosmetics, movies, and the like. In another embodiment, if the profile indicates that the user is a male who has interest in basketball, it may be determined that the user would like to view objects associated with basketball games, basketball star players, and the like.

The profile may be generated by collecting personal information of the user, for example, when the user registers with a video playing system. Alternatively, or in addition, information in the profile may be obtained, for example, from a video viewing history and/or a browsing history of the user. It may be understood that these examples are described for illustration rather than limitation. Those skilled in the art may obtain the profile in many other suitable ways. The profile may be stored in a local storage, for example, a hard disk, a portable computer diskette, a flash memory, and a memory stick, or a remote storage, for example, a cloud storage system, or other suitable storage accessible to the device 200 (FIG. 2).

In some embodiments, in step 320, the device 200 (FIG. 2) may determine whether the object has an attribute. If the object has an attribute, the device 200 (FIG. 2) further determines whether the attribute matches the profile. If the object has two or more attributes, the device 200 (FIG. 2) may determine whether any of the attributes matches the profile. If the device 200 finds that an attribute of the object matches the profile (that is, there is a matching attribute), the method 300 proceeds to step 330.

In some embodiments, it is possible that the object does not have any matched attribute. For example, the object does not have any attribute, or none of the object's attributes matches the profile. If such attribute mismatching occurs, it may be determined that the object does not have an attribute associated with the profile. Then, the method 300 may proceed to an attribute generation procedure in which an attribute may be generated for the object based on the profile. The attribute may be generated immediately after the device 200 (FIG. 2) cannot find the matching attribute. As an alternative, the attribute may be generated after a predetermined time of attribute mismatching, as will be discussed in detail below with reference to FIG. 4.

Next, in step 330, in response to determining that the object has an attribute associated with the profile, a target segment including the object is determined from the video. The determined target segment, which contains one or more objects the user is interested in, may be displayed to the user, for example, on a display screen of the device 200 (FIG. 2) in order to improve the user experience.

In some embodiments, there may be a plurality of segments that include the object, which are referred to as "candidate segments." In step 330, the device 200 (FIG. 2) may obtain the candidate segments from the video, each of which may have characteristics, such as a duration indicating the length of the segment and a start timestamp. The start timestamp indicates an instant of the beginning of a candidate segment in the video. Additionally, each segment may have many other suitable characteristics, for example, visual quality, associated object(s), and the like. With the information about durations of the candidate segments, the device 200 (FIG. 2) may determine the target segment from the candidate segments according to a predetermined time interval of the target segment. The predetermined time interval may be set, for example, as 5 seconds, by the user, the provider of the video or other related party. In an example where there are 10 candidate segments and the duration of each candidate segment is 1 second, the device 200 may select 5 candidate segments from the 10 candidate segments and combine them as the target segment. Examples of the determination of the target segment will be discussed in detail below with reference to FIG. 4.

Figure 4:
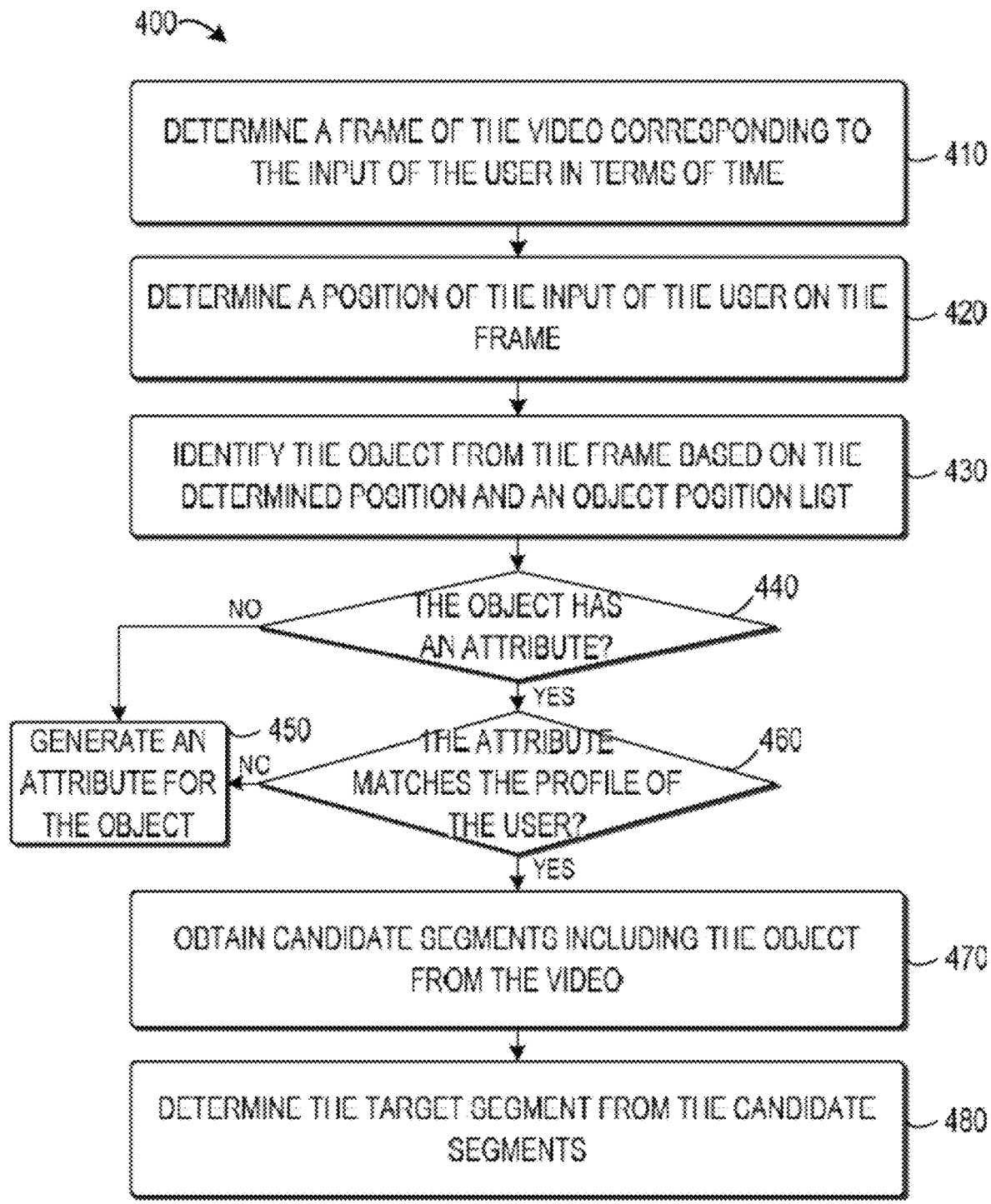
FIG. 4 is a flowchart describing the steps of a method for video interaction, according to an embodiment of the present disclosure.

Referring now to FIG. 4, a flow chart describing the steps of a method 400 for video interaction is shown in accordance with further embodiments of the present disclosure. The method 400 may be considered an implementation of the method 300. It may be understood that the method 300 may be implemented in several ways as discussed above, and the method 400 is only one example instead of a limitation.

The method 400 may start at step 410, where a frame of the video corresponding to the user input in terms of time is determined, as described above. In step 420, a position of the user input on the frame is determined. In some embodiments, the input may be the contact of the user's finger. The position of the input may be determined as the coordinates of the finger contact on the frame. In step 430, the object is determined from the frame based on the determined position and an object position list. The object position list may be defined by correlating objects in the video with their positions in respective frames. An example of the object position list is shown in Table 1.

TABLE 1

| Object | Frame ID | Location Range |
|---|---|---|
| Star player 1 | 510 | (50, 50) (100, 100) |

In the example of Table 1, the object is a star player 1 located in the range "(50, 50) (100, 100)" in the frame 510. The coordinates of the top left corner of the location range are (50, 50), and the coordinates of the bottom right corner of the location range are (100, 100). It may be understood that the above object position list is just an example, rather than limitation. Those skilled in the art would appreciate that the object position list may be implemented in other suitable ways. For example, Table 2 shows another example of the object position list.

TABLE 2

| Object | Start Timestamp | Duration | Location Range |
|---|---|---|---|
| Star player 1 | 00:16:25 | 1 s | (50, 50) (100, 100) |

In the example of Table 2, the object is the star player 1 in a segment that starts at a timestamp of 00:16:25 and its duration is 1 s. The object is located in a location range of the segment. The coordinates of the top left corner of the location range are (50, 50), and the coordinates of the bottom right corner of the location range are (100, 100). It is to be understood that a range in a frame may be represented in any suitable ways other than the one shown in Table 1. In some embodiments, a segment may include one or more frames. It may be verified whether the frame determined in step 410 belongs to the segment. If so, the corresponding frame may be found and it may be determined whether the position of the user input corresponds to an object.

Figure 5:
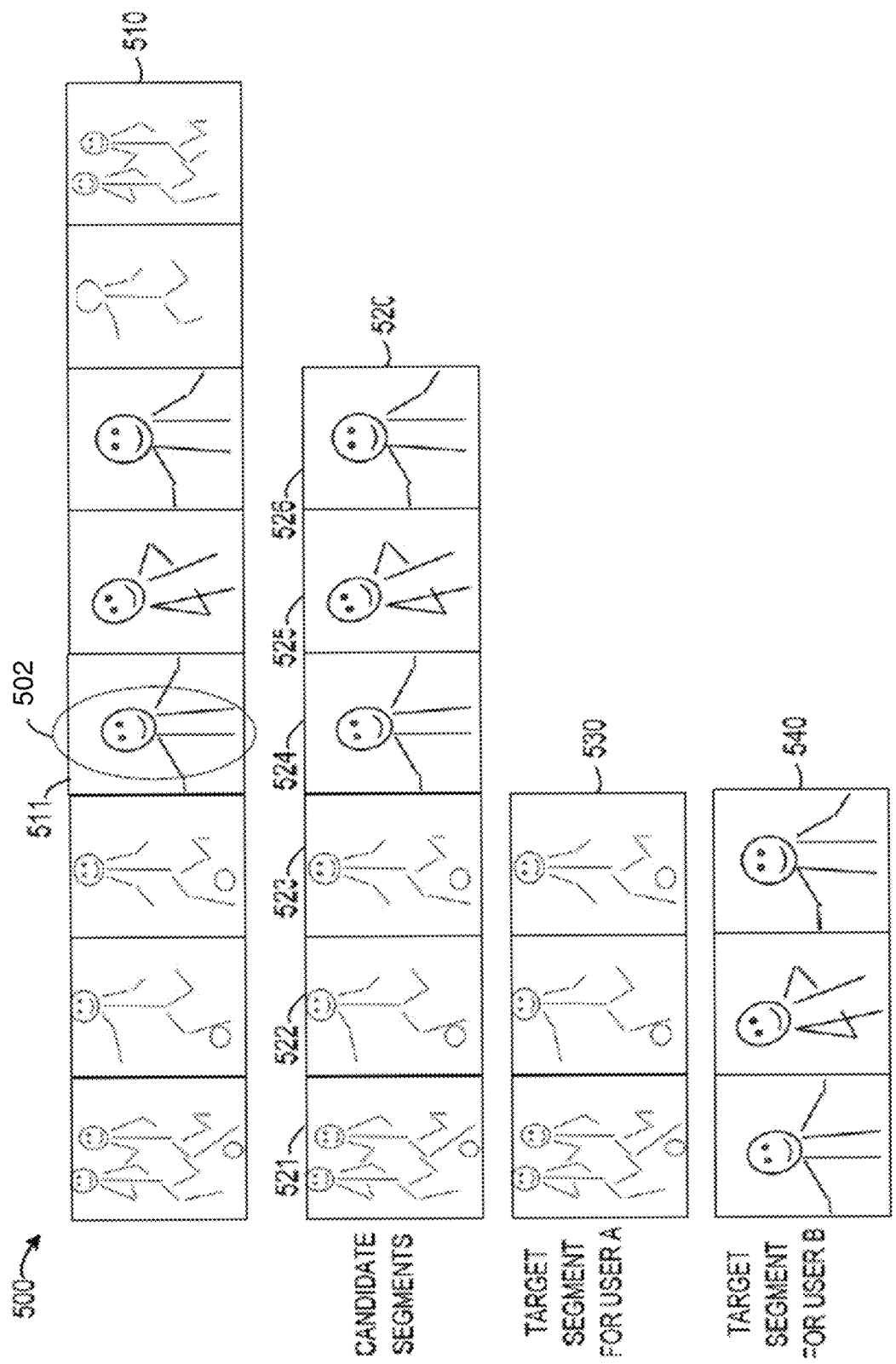
FIG. 5 is a schematic diagram of video interaction, according to an embodiment of the present disclosure.

For instance, in the schematic diagram 500 shown in FIG. 5, a frame 510 is determined according to the user input. The user input is detected as located at a position 511, which has coordinates of (60, 80). Since the coordinates (60, 80) fall into the location range (50, 50) (100, 100) of the object "Star player 1" of the object position list, as illustrated by Table 1, it may be determined that the user input corresponds to the object "Star player 1" 502.

With continued reference to FIG. 4, in step 440, it is determined whether the object has an attribute. If the object has an attribute, the method 400 proceeds to step 460 to make further judgment. If the object does not have any attribute, the method 400 goes to step 450 where a new attribute is generated for the object.

In step 450, a new attribute is generated for the object based on the user profile. In some embodiments, an attribute may be generated for the object based on the preference of the user immediately after the device 200 cannot find the matching attribute. In this case, if the profile indicates the user prefers to view objects related to shopping, an attribute of "shopping" may be assigned to the object. As an alternative, the attribute generation procedure may be performed after a predetermined time of attribute mismatching is reached. For instance, if an object has been selected by three users and the attribute mismatching has happened three times, then the device 200 may generate one or more attributes for the object by considering profiles of the three users.

In step 460, it is determined whether the attribute matches the user profile. In some embodiments, the object may have several attributes, and each of the attributes may be compared with the profile. If none of the attributes matches the profile, the method 400 goes to step 450 to generate a new attribute for the object. If there is any attribute that matches the profile, it may be determined that the object has an attribute associated with the profile, and the method 400 proceeds to step 470.

In some embodiments, the object and its attribute may be recorded in a variety of ways. Table 3 shows examples of records for three objects and their respective attributes.

TABLE 3

| Object | Detail Info | Time Interval | Class 1 | Class 2 | Class 3 | Class 4 | Target Audience |
|---|---|---|---|---|---|---|---|
| Clothes 1 | ... | 1 s | Article | Clothes | Female | {Blue, Stripes} | {Female, 18 to 35 years old, Shopping} |
| Star player 1 | ... | 5 s | Person | Sports | Football | {Kicking actions, Reaction shots} | {Male, Female, 36 to 50 years old, Football} |
| Football | ... | 3 s | Article | Sports | Football | Null | {Male, Null, Football} |

Table 3 illustrates three objects, namely, "Clothes 1", "Star player 1", and "Football." Each of the objects may have detailed information about introduction of the object, historical records of the object, and the like. Furthermore, each of the objects has a time interval, which may be predetermined as the length of the target segment associated with the object. In the example of Table 3, each of the objects has multiple attributes, such as, Class 1, Class 2, Class 3, Class 4 and Target Audience. In an embodiment, it is supposed that the object identified in step 430 is "Star player 1," and it may be determined that the object has the attributes including "Person," "Sports," "Football," "Kicking actions," "Reaction shots," "Male," "Female," and "36 to 50 years old." In particular, Class 4 of the object "Star player 1" is "{Kicking actions, Reaction shots," which indicates that object "Star player 1" has segment(s) regarding kicking actions and segment(s) regarding reactions shots. It may be understood that the attributes shown in Table 3 are only described for illustration rather than limitation. Those skilled in the art would readily understand that an object may have many other attributes.

Whether the attribute matches the user profile may be determined in a variety of ways. In an example, the user profile may include contents as shown in Table 4 below.

TABLE 4

| Hobby | Habit | Gender | Age | ... |
|---|---|---|---|---|
| Football | Viewing kicking actions | Male | 37 | ... |

In the example of Table 4, the user profile indicates that the user has a hobby of "football", a habit of "viewing kicking actions", a gender of "male", and an age of about 37 years old. In some embodiments, in the determination of whether there is an attribute associated with the profile, similarities between an attribute of the object and contents in the profile may be calculated, and if any of the similarities exceeds a predetermined threshold, it may be determined that the attribute matches the profile and is thus associated with the profile. Referring back to the example described above with respect to Table 3, where attributes of the object "Star player 1" include "Person", "Sports", "Football", "Kicking actions", "Reaction shots", "Male", "Female", and "36 to 50 years old", it may be determined that there are several attributes, such as "Football", "Kicking actions", "Male", and "36 to 50 years old", matching the user profile of Table 4. As such, it may be determined that the attribute matches the user profile in step 460, and the method 400 then proceeds to step 470.

It may be understood that the attributes shown in Table 4 are only described for illustration rather than limitation. Those skilled in the art would readily appreciate that the user profile may have many other contents, and the matching between an attribute of the object and the user profile may be implemented in other suitable ways.

In step 470, candidate segments including the object are obtained from the video. In some embodiments, a video, a plurality of segments including various objects may be selected and recorded in advance. For example, records about segments including the objects are shown in Table 5 below.

TABLE 5

| Object | Segment | Start Timestamp | Duration | Quality Level | Type | Other object |
|---|---|---|---|---|---|---|
| Star player 1 | 1 | T1 | 1 s | 3 | Kicking actions | Football |
| Star player 1 | 2 | T2 | 1 s | 3 | Reaction shots | Null |
| ... | ... | ... | ... | ... | ... | ... |
| Clothes 1 | N-1 | $T_{N-1}$ | 1 s | 5 | Blue | Star Player 2 |
| Clothes 1 | N | $T_N$ | 1 s | 4 | Stripes | Star Player 1 |

In Table 5, the object "Star player 1" is included in segment 1 and segment 2. The segment 1 starts at a start timestamp T1 and lasts 1 s. The quality level of the object is 3, which indicates the quality of the segment, such as resolution, definition, signal-to-noise ratio (SNR), and so on. In some embodiments, the larger the quality level of the object, the better the quality of the segment. In Table 5, "Type" indicates the type of the object included in a segment. For instance, with respect to segment 1, the type is "Kicking actions", which indicates that segment 1 relates to the kicking actions of the star player 1. Likewise, the segment 2 relates to the reaction shots of the star player 1. Additionally, in Table 5, "Other object" indicates another object associated with the object. For example, if both the star player 1 and a football appear in the segment 1, the object "Star player 1" may be determined as being associated with an object "Football".

In the example of Table 5, the segment 1 and the segment 2 may be determined as the candidate segments including the object "Star player 1". It may be appreciated that the candidate segments may include a part or all of the segments that contain the object.

In step 480, the target segment is determined from the candidate segments. In some embodiments, the target segment may be directly determined as a combination of all the candidate segments. As an alternative, the target segment may be determined from the candidate segments based on the user profile. For example, for a user (hereinafter "user A") who is male and is interest in kicking actions, candidate segments regarding kicking actions of a star player may be selected and combined as a target segment. For another user (hereinafter "user B") who is female and is interest in reaction shots, candidate segments regarding reaction shots of the star player may be selected and combined as a target segment.

For instance, as shown in FIG. 5, a candidate segment group 520 is obtained from the video. The candidate segment group 520 includes six candidate segments 521, 522, 523, 524, 525 and 526. Each of the six candidate segments includes the object "Star player 1" 502. For the user A, the target segment is determined based on a subgroup of the candidate segments 530 regarding kicking actions of the "Star player 1." For the user B, the target segment is determined based on a subgroup of candidate segments 540 regarding reaction shots of the "Star player 1".

Alternatively, or in addition, in some embodiments, the target segment may be determined from the candidate segments based on durations of the candidate segments and a predetermined time interval of the target segment. In an embodiment, a total sum of the durations of all the candidate segments may be calculated. If the total sum exceeds a predetermined time interval of the target segment, some of the candidate segments are selected in such a way that a sum of durations of the selected candidate segments equals to the predetermined time interval of the target segment. Then the target segment may be obtained by combining the selected candidate segments.

In addition, or alternatively, if the total sum of the durations of the candidate segments is less than the predetermined time interval of the target segment, the candidate segments may be processed to meet the time requirement of the target segment in several ways. In an embodiment, weights may be determined for the candidate segments based on attributes of the candidate segments and/or the profile of the user. For example, the weights may be determined according to the quality levels of the respective candidate segments. Then, the durations of the candidate segments may be weighted, such that a sum of durations of the weighted candidate segments equals to the predetermined time interval of the target segment. The target segment may be obtained by combining the weighted candidate segments.

Therefore, by receiving an input from a user, where the input includes a selection of an object contained in a video, the object can be identified in response to the input and an attribute of the object associated with a profile of the user can be determined such that a target segment in the video containing the object can be obtained according to a preference of the user regarding at least one object to be viewed.

The methods 300 and/or 400 may be implemented by computer programs. For example, the computer programs, when executed by a processor on a device (such as the computer system 12 shown in FIG. 1, or one or more cloud computing nodes 100 (FIG. 6), may be loaded into the memory and cause the device to implement the method 300 and/or 400.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
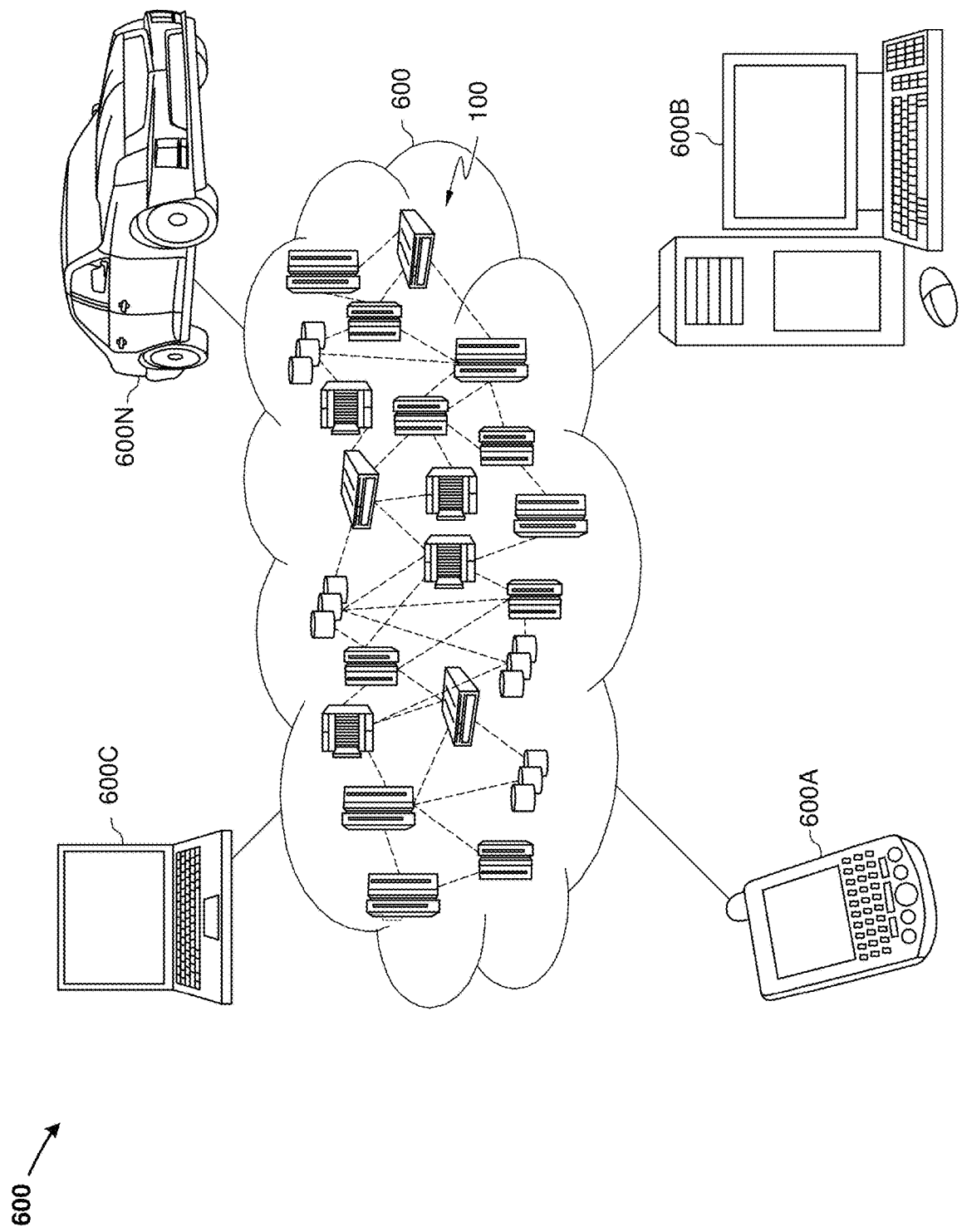
FIG. 6 is a block diagram of an illustrative cloud computing environment, according to an embodiment of the present disclosure.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
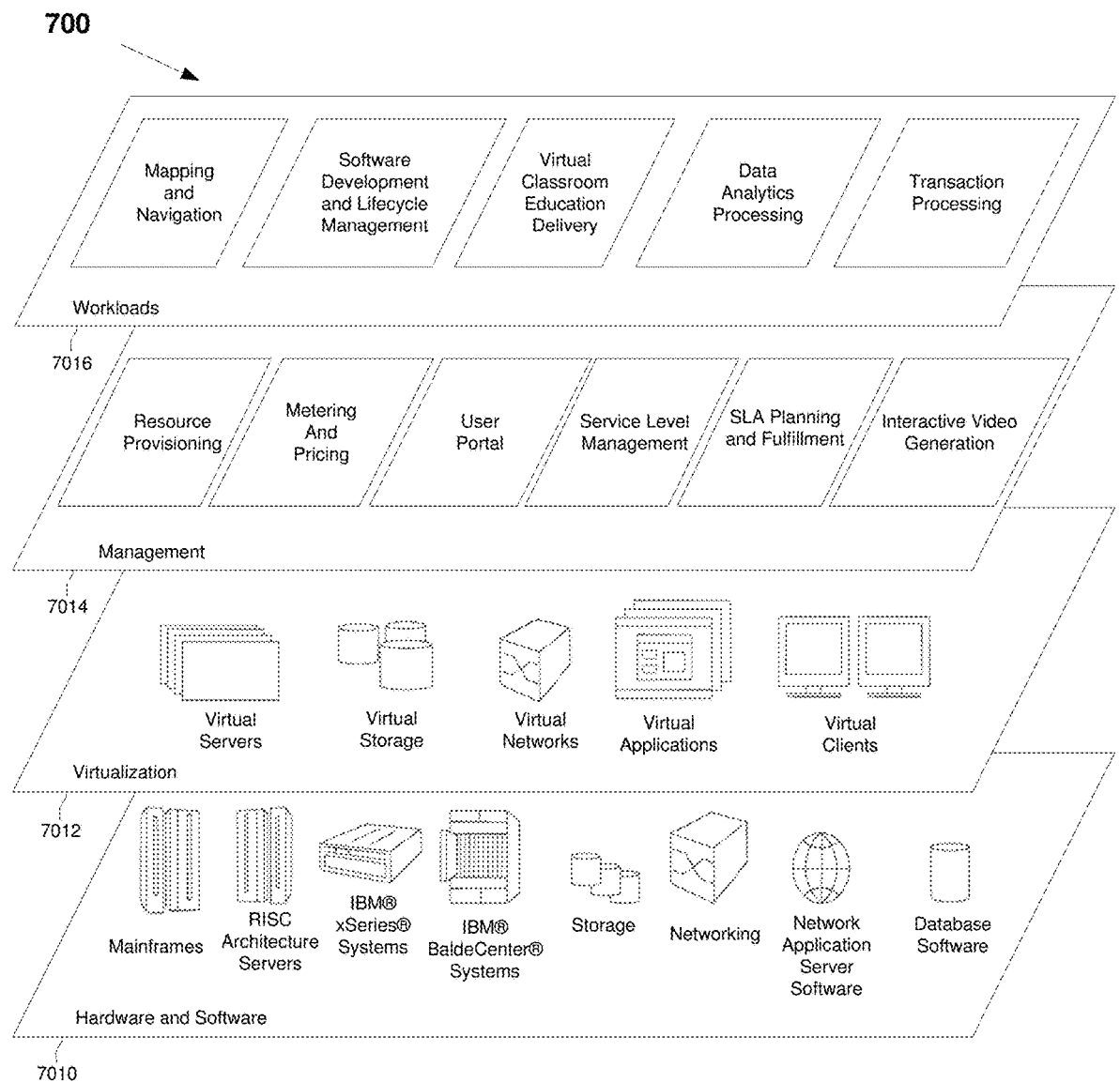
FIG. 7 is a block diagram of functional layers of the illustrative cloud computing environment of FIG. 6, according to an embodiment of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 7010 includes hardware and software components. Examples of hardware components include: mainframes; RISC (Reduced Instruction Set Computer) architecture based servers; storage devices; networks and networking components. In some embodiments, software components include network application server software.

Virtualization layer 7012 provides an abstraction layer from which the following examples of virtual entities may be provided: virtual servers; virtual storage; virtual networks, including virtual private networks; virtual applications and operating systems; and virtual clients.

In one example, management layer 7014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A program for interactive video generation.

Workloads layer 7016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a device, an input from a user, the input comprising a selection of an object contained in a video played on the device, the selection is made via a touch gesture performed by a user's finger on a touchscreen of the device;
   determining a frame of the video comprising an image displayed at a time the input from the user is received;
   determining a position of the input of the user on the frame;
   identifying the object in the determined frame by applying image recognition techniques, the identifying of the object from the frame is based on the determined position and an object position list, the object position list comprising information about positions of objects in the video;
   comparing attributes of the object with user preferences defined in a user profile, the attributes comprising object characteristics, an object type, an object target customers, object price, and an object manufacturer, and the user preferences comprising one or more characteristics of the object previously selected by the user;
   in response to at least one attribute of the object matching at least one user preference defined in the user profile, identifying segments from the video which display the object, each segment comprising a duration and one or more frames;
   calculating a total sum of the duration of the identified segments;
   comparing the total sum to a predetermined time interval; and
   based on the calculated sum being equal to the predetermined time interval, combining the identified segments to provide a video tailored to the user preferences specified in the user profile.

2. The method of claim 1, wherein the image recognition techniques comprise edge matching, divide-and-conquer search, greyscale matching, and gradient matching.

3. The method of claim 1, further comprising:
   generating the attributes for the object based on the user profile.

4. The method of claim 1, further comprising:
   selecting, in response to the calculated sum exceeding the predetermined time interval, a portion of each identified segment based on the user profile; and
   combining the portion of each identified segment.

5. The method of claim 1, further comprising:
   determining, in response to the calculated sum being less than the predetermined time interval, weights for the identified segments based on attributes of the identified segments;
   weighting the duration of the identified segments; and
   combining the identified segments.

6. A method comprising:
   receiving, by a device, a user input comprising a touch gesture performed by a user's finger on a touchscreen of the device, wherein an object is selected among one or more objects contained in a video played by the device via the touch gesture, the object comprising a product, a person, or a facility of interest to a user of the device;
   determining a frame of the video comprising an image displayed at a time the user's finger contacts the touchscreen;
   determining a first set of coordinates corresponding to a position of the user's finger on the frame;
   obtaining an object position list comprising a frame id associated with a second set of coordinates for each object in the one or more objects, wherein each second set of coordinates corresponds to a location range associated with each of the one or more objects in the video;
   based on the first set of coordinates being located within the second set of coordinates of at least one object within the one or more objects, recognizing the at least one object as the object selected by the user's finger;
   comparing attributes of the object with user preferences defined by a user profile, the attributes comprising object characteristics, an object type, an object target customers, object price, and an object manufacturer, and the user preferences comprising one or more characteristics of the object previously selected by the user;
   in response to at least one attribute of the object matching at least one user preference defined by the user profile, identifying segments from the video which display the object, each segment comprising a duration and one or more frames;
   calculating a total sum of the duration of the identified segments;
   comparing the total sum to a predetermined time interval; and
   based on the calculated sum being equal to the predetermined time interval, combining the identified segments to provide a video tailored to the user preferences specified in the user profile.

7. The method of claim 6, further comprising:
   generating the attributes for the object based on the user profile.

8. The method of claim 6, further comprising:
   selecting, in response to the calculated sum exceeding the predetermined time interval, a portion of each identified segment based on the user profile; and
   combining the portion of each identified segment.

9. The method of claim 6, further comprising:
   determining, in response to the calculated sum being less than the predetermined time interval, weights for the identified segments based on attributes of the identified segments;
   weighting the duration of the identified segments; and
   combining the identified segments.

* * * * *